United States Patent
Joukov (10) Patent No.: US 8,037,240 B2
(45) Date of Patent: Oct. 11, 2011

(54) SYSTEM AND METHOD FOR USING REVERSED BACKUP OPERATION FOR MINIMIZING THE DISK SPINNING TIME AND THE NUMBER OF SPIN-UP OPERATIONS

(75) Inventor: Nikolai Joukov, Hawthorne, NY (US)

(73) Assignee: International Business Machines Corporation, Armonk, NY (US)

(*) Notice: Subject to any disclaimer, the term of this patent is extended or adjusted under 35 U.S.C. 154(b) by 457 days.

(21) Appl. No.: 11/877,947

(22) Filed: Oct. 24, 2007

(65) Prior Publication Data

US 2009/0113123 A1  Apr. 30, 2009

(51) Int. Cl.
*G06F 13/12* (2006.01)
(52) U.S. Cl. .................................. 711/112
(58) Field of Classification Search .............. None
See application file for complete search history.

(56) References Cited

U.S. PATENT DOCUMENTS

| | | | | |
|---|---|---|---|---|
| 7,069,351 B2* | 6/2006 | Chung | | 710/33 |
| 7,366,861 B2* | 4/2008 | Manchester et al. | | 711/165 |
| 7,389,379 B1* | 6/2008 | Goel et al. | | 711/112 |
| 7,620,773 B2* | 11/2009 | Nicholson et al. | | 711/113 |
| 2004/0153694 A1* | 8/2004 | Nicholson et al. | | 714/4 |
| 2006/0053347 A1 | 3/2006 | van Ingen et al. | | |
| 2007/0028139 A1* | 2/2007 | Wahl et al. | | 714/6 |
| 2007/0033356 A1 | 2/2007 | Erlikhman | | |
| 2007/0136397 A1* | 6/2007 | Pragada et al. | | 707/204 |
| 2007/0168518 A1 | 7/2007 | McCabe et al. | | |
| 2007/0239952 A1 | 10/2007 | Hwang et al. | | |
| 2008/0140901 A1* | 6/2008 | Corrion | | 710/305 |

OTHER PUBLICATIONS

Young, "PCT Notification of Transmittal of the International Search Report and the Written Opinion of the International Searching Authority, or the Declaration," Dec. 3, 2008, 9 pages.

Young, "PCT Notification of Transmittal of the International Search Report and the Written Opinion of the International Searching Authority, or the Declaration," for PCT/US2008/77152, dated Dec. 4, 2008, 8 pages.

Zadok et al., "A Stackable File System Interface For Linux," LinuxExpo Conference Proceedings, http://www.fsl.cs.sunysb.edu/docs/linux-stacking/linux.pdf, May 1999, pp. 1-10.

* cited by examiner

*Primary Examiner* — Duc T Doan
(74) *Attorney, Agent, or Firm* — Louis J. Percello; Hoffman Warnick LLC (57) ABSTRACT

A system and method for providing reversed backup operation for keeping local hard drives in a stand-by (non-spinning) mode thereby extending the life of local hard drives and reducing power consumption, heat and noise produced by the local drives. The present invention uses remote storage systems as primary storage systems when the network connectivity and its bandwidth are sufficient so that the local hard disk can stay in the stand-by mode. If the network connectivity is unavailable or insufficient to handle the data flow, the local hard disk is spun up and temporarily used as the primary storage for reads and writes. When necessary and possible, the data on both storage locations is synchronized.

17 Claims, 8 Drawing Sheets

Method for Determining which Data Storage to Access

Figure 1A – Operation of System in "normal" mode

Figure 1B - System Operation during Synchronization

Figure 1C - System Operation using Local Storage

Figure 1D

Figure 2. Stackable Implementation of the System

Figure 3B – Method for Determining which Data Storage to Access

Figure 4

SYSTEM AND METHOD FOR USING REVERSED BACKUP OPERATION FOR MINIMIZING THE DISK SPINNING TIME AND THE NUMBER OF SPIN-UP OPERATIONS

CROSS-REFERENCE TO RELATED APPLICATIONS

This patent application is related to patent application filed concurrently herewith, Ser. No. 11/877,931, entitled LOCAL FLASH MEMORY AND REMOTE SERVER HYBRID CONTINUOUS DATA PROTECTION.

BACKGROUND OF THE INVENTION

1. Field of the Invention

The present invention generally relates to a method and system for backing up data while extending the life of local hard drives and reducing power consumption, heat and noise. Specifically, the present invention provides a system and method for reversed backup operation for keeping local hard drives in a stand-by mode (that is, not spinning) thereby extending the life of local hard drives and reducing power consumption, heat and noise produced by the local drives.

2. Related Art

Hard disks are mechanical devices. (A hard disk or hard disk drive (HDD), commonly referred to as a hard drive, hard disk or fixed disk drive, is a non-volatile storage device which stores digitally encoded data on rapidly rotating platters with magnetic surfaces. For more information about HDDs, see http://www.techweb.com/encyclopedia/defineterm.jhtml?term=harddisk.) When their disks are spinning, HDDs consume power, generate noise, and are sensitive to shocks and impacts. Hard drives consume from 5% to 31% of the desktop and notebook computer power. This not only increases the overall IT power consumption and reduces battery life of portable computers but also increases the amount of heat generated by the system. Excessive heat can cause discomfort to the user and increase the power consumption of fans to remove the heat from the computer and air conditioners to cool the ambient air in the work environment. Office computers consume about 1% of the electricity produced in the United States with additional 1.2% consumed by the data centers. Given the expected growth of the number of computers, these fractions are expected to significantly increase in the future. The situation is especially critical in major cities where the electricity prices are the highest and the power supply increases may not be possible at all. In these cases, the only possibility to expand the businesses is to lower the existing power consumption.

Even low intensity office noise (e.g., from the spinning of HDDs in workstations or laptops) reduces productivity, motivation, ability to learn, and can even cause health risks. Noise levels of the average desktop hard drives rotating at 5,400-7,200 RPM are typically between 30 and 50 dBA. High-performance hard disks with higher rotational speeds generate more noise. Disk head seek-related sounds distract the users even more due to their irregular nature. (To read and write to the surface of the disks, the drive uses a small electro-magnet assembly, referred to as a head, located on the end of an actuator arm. There is one head for each platter surface on the spindle. The disks are spun at a very high speed to allow the head to move quickly over the surface of the disk. Towards the other end of the actuator arm is a pivot point, and at the end is a voice coil, which moves the head.) While one may argue that it is possible to manufacture computers with better sound-insulation, there is a need for a system and method which reduces the level of office noise with existing hardware.

Furthermore, spinning hard disk drives are fragile and sensitive to shocks. (Workstations and, of course, laptops are much more susceptible to being subject to a physical impact as a result of the workstation/laptop or, especially in the case of the laptop, being dropped.) The relative speeds of the disk heads moving over the disk platters depend on the disk speed and can exceed 150 miles per hour for 15 KRPM drives. In case of an abrupt impact or vibration, disk heads can touch and damage the platter surfaces.

Gyroscopic effects exacerbate the problem for mobile devices. Even small disk platter damage can create a chain reaction of collisions of the particles scratched from the platters, the disk heads, and the disk platters. Therefore, even a single collision of the disk drive head and the platters can result in the rapid loss of the drive and loss of the data.

Non-rotating disks in the stand-by mode consume an order of magnitude less power and generate less heat than busy disks and at least three times less than idle rotating disks. For the purposes of this application, the term "stand-by" refers to non-spinning or non-rotating disks. Further, non-rotating, or non-spinning, disks are silent. They are also typically four to five times less sensitive to shocks and, thus, are more reliable. Therefore, it is desirable to minimize the time the disks are spinning.

Most solutions to the "rotating hard disk" problem that exist today target either portable devices, servers, or RAID controllers. "One media" solutions are trying to solve the problem with only one storage device. Unfortunately, it is impossible to predict the future (including the disk access patterns), and delaying writes increases the risk of losing data. Data read mispredictions frequently increase power consumption compared to the systems where the disk drives are spinning all the time. Also, it takes several seconds for the user to wait for the disk drive to spin-up in case of a read request that missed the caches. Delaying data writes increases the chances of the data loss and frequently spinning up the disk significantly increase the hard disk wear. For example, desktop hard disks can sustain only about 50,000 total spin-up procedures before they fail. Flash memory consumes little power and is fast. However, it is small and can sustain only a limited number of writes. Hybrid drives contain built-in non-volatile flash memory. It increases the amount of memory available for caching and allows to persistently store some amount of data writes without spinning up the disk drive. Therefore, hybrid drives allow to prefetch more data and delay the data writes to the disk without sacrificing the data reliability. Unfortunately, hybrid drives only partially solve the above problems. Read request mispredictions and large volumes of writes still require accessing the disk. Also, hybrid drives are hardware solutions that require replacement of the existing hard drives, are hard or impossible to upgrade if the flash memory wears out and operate on the data blocks and thus have no access to the file-system-level meta-information. (Meta-information is necessary for the data prefetching optimizations.) Experimental driver-level solutions that work with a hard disk drive and a flash drive as two independent devices are free from the first and the second problems.

Disk-less servers, workstations, and thin clients use remote storage instead of the local hard drives. Remote storage systems usually consist of many hard disks. Such systems can distribute the data on the disks according to its popularity, use multi-speed disks or disks with different characteristics, and can dedicate some disks for write and read caches. This frequently allows the ability to keep a significant percentage of the number of disks off. Unfortunately, disk-less clients require permanent and high quality network connectivity. Therefore, this technique is not suitable for most mobile systems. Also, disk-less systems are less common and thus harder to configure and support for users and administrators and, thus, systems using hard drives are most prevalent.

Hard disks in most notebook and server systems are kept in the idle mode even when no read or write requests are being served. Systems that do put their hard disks into the stand-by (non-spinning) mode frequently add more problems than they solve.

Completely diskless clients add inconvenience for the users and administrators. Desktop solutions have high latency and become unusable in case of network problems. Also, such systems have different administration processes, which is not confined by the machines themselves. That is the reason why diskless desktops and servers have limited adoption. With the recent increase of the sizes of flash memory, it is expected that flash memory may replace the system disks. However, the sizes that are available today and at least in the near future are still much smaller and more expensive than users need.

Solutions that combine multiple (possibly different) disks were shown to be more effective for server-type workloads. Unfortunately, servers and desktops have only one (system) disk. A combination of flash memory and hard disks partially solves the problem but still can result in shortened life-time and long access latencies in case of the flash memory read misses. Previous attempts to augment the disk and flash with the network connectivity to store the data were shown to improve performance and prolong battery life on mobile systems. However, they can shorten the disk life-times and increase power consumption on the server and, as a result, overall on the enterprise scale.

Data reliability and availability are usually the most important requirements for storage systems. Traditional power optimization solutions frequently contradict these requirements and decrease user and administration convenience. For example, frequent spin-up and spin-down operations increase data reliability and availability but significantly decrease the life-time and thus reliability of the hard disk drives. As a result, these features are usually disabled or configured for about hour long time-outs on most servers and desktops. Notebook hard disks can survive about an order of magnitude more spin-up operations but will still wear out within a year if only the break-even balance of power is considered. Similarly, diskless clients degrade performance and become non-operational in case of network infrastructure problems.

In addition to power consumption, hard disks pose a set of other problems such as noise, fragility, and ease of being stolen or lost. However, servers, desktops, and mobile systems have different disks and different deployment scenarios, which make some of the above problems important or completely unimportant. For example, a disk in a notebook consumes almost no power in the idle state and its power consumption optimization not only makes no sense at the enterprise scale but usually has negligible effect on the battery life. A desktop in the enterprise is almost always reliably connected to the fast local network whereas a notebook can get disconnected at any time.

There is a need for a client file system which provides the following functions:
1. provides run-time data protection (CDP or at least replication) of each hard disk in the enterprise, even when a desktop loses connectivity due to temporary network problems or when a mobile client is away from the network infrastructure, without significantly increasing the cost of required backup storage;
2. spins the local hard disks up for short periods of time and only several times a day;
3. provides data access latency and bandwidth similar to the operation with the local disks at least under typical user workloads; and
4. requires minimal hardware and software modifications in existing infrastructure.

Hard disks fail, fail inevitably and unexpectedly. People make mistakes and overwrite or delete useful data. Hard disks or whole computers get lost or stolen. Data backup systems try to minimize the consequences of these harmful events. Traditional backup systems create snapshots of a subset of files on a periodic basis. This poses two problems:
1. Some important data may be left unprotected due to subset of files selection mistakes (which is usually realized when it is already too late); and
2. the most recent (and thus frequently most important) data updates are not protected.

The first problem could be solved by backing up whole hard disks. However, it is usually time consuming and considered prohibitively expensive because of the expensive storage systems used for backups. Also, increasing the amount of backup storage increases the enterprise power consumption.

The second problem is partially solved by the run-time data replication. In addition, reverting to an earlier version of the file is frequently desirable. For example, if a user deletes a portion of the document by mistake, he may need to revert to an earlier version of the file to recover the deleted portion. Continuous Data Protection (CDP) preserves backup copies for every data update on-the-fly. This allows users to roll-back any file to any previous state in time. Unfortunately, mobile users are still left unprotected when not connected to a reliable network link.

Therefore, there exists a need for a solution that solves at least one of the deficiencies of the related art.

SUMMARY OF THE INVENTION

The present invention provides methods and program products which provide for reversed backup operation for keeping local hard drives in a stand-by (non-spinning) mode thereby extending the life of local hard drives and reducing power consumption, heat and noise produced by the local drives.

Data replication on the local hard disks and remote servers is a common technique used to improve data survivability. For example, Continuous Data Protection (CDP) systems can replicate the data on a remote server every time the local data is modified. The present invention uses remote storage systems as primary storage systems when the network connectivity and its bandwidth are sufficient. During the times in which the data is being read from and written to the remote storage, the local hard disk can stay in the stand-by mode. If the network connectivity is unavailable or insufficient to handle the data flow, the local hard disk is spun up and temporarily used as the primary storage for reads and writes. When possible, the data on both storage locations is synchronized. In particular, when the drive is spun up, all the writes previously committed to the remote storage are written to the local disk. When the system gains sufficient network connectivity the data previously written to the local hard disk gets written to the remote server.

Mobile systems that can lose network connectivity at any time should keep the data committed to the remote server in memory. These systems should flush such data to the local disk upon powering the system down or losing the network connectivity. Note that the data is always persistently stored in at least one of the storage locations. Because the server-side storage is much more reliable than the local storage, the data reliability is the same as in the case of ordinary CDP system. The data is stored on the CDP server whenever possible and on the local hard disk otherwise. Wired NICs consume less power than hard disks. Modern wireless network interfaces and protocols provide sufficient security, bandwidth, low latency, and consume little power. In addition, wireless interfaces are present in most modern mobile computers and some have even several varieties (e.g., WiFi and Bluetooth). The hard disk drive can be put into the stand-by (non-spinning) mode when no data is read or written. Therefore, the power savings on the local system originate from (1) the savings of power during the time the hard drive is normally kept idle (the disk is spinning but no read or write requests are served) and (2) less frequent disk spin-up operations compared to conventional disk power saving approaches. In addition, backup storage systems with multiple large hard drives frequently consume less energy than all local disks in the individual computers that use the backup server. Therefore, the present invention allows decreasing the total amount of energy consumed in the enterprises.

The present invention has the following advantages for personal computers and portable devices:
1. power saving on the client (and overall in the enterprise if special power saving measures on the backup server(s) are applied);
2. reduced noise levels; and
3. increased disk drive survivability of shocks and vibrations.

Compared to the standard solutions based on the data prefetching, the proposed invention requires much fewer disk spin-ups and thus has the following extra advantages:
1. allows to save more power; generate less or no noise; and keep the disk less vulnerable to shocks;
2. does not decrease the disk life-time; and
3. users do not have to wait for several seconds until the disk is spun up in case of a cache miss.

The system and method of the present invention can also be deployed on the servers configured as CDP clients in the data centers. In that case it can provide the following additional benefits:
1. reduced heat generation on the computational nodes; and
2. total system heat generation reduction because, as described before, storage systems with multiple hard drives can optimize their power consumption much more efficiently.

The present invention allows switching between a remote server and a local hard disk as necessary (e.g., during periods of high I/O activity) and the systems are still configured as normal systems with the boot disk, which is convenient for the users.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE DRAWINGS

The continuous data protection (CDP) client file system of the present invention provides hierarchical run-time data protection for all data and allows most enterprise hard disks to be kept in the stand-by state (without platters rotation) most of the time. The CDP client file system of the present invention does not decrease the disk life-time in order to be used in real enterprises. The CDP client file system substantially increases data reliability, decreases overall power consumption, makes enterprises greener, increases user convenience by improving performance, and decreases office noise levels.

Summarizing, CDP client file system of the present invention provides the following functions:
1. provides run-time data protection (CDP or at least replication) of each hard disk in the enterprise, even when a desktop loses connectivity due to temporary network problems or when mobile clients are away from the network infrastructure, and without significantly increasing the cost of required backup storage;
2. spins the local hard disks up for short periods of time and only several times a day;
3. provides data access latency and bandwidth similar to the operation with the local disks at least under typical user workloads; and
4. requires minimal hardware and software modifications in existing infrastructure.

To solve the above challenges, the CDP client of the present invention provides the following advantages: (1) buffered all-time protection; (2) reversed backup operation; and (3) all data protection. In addition, CDP client file system of the present invention is modular to fit any existing enterprise IT infrastructure. This patent application will discuss specifically (2) reversed backup operation.

Figure 1A:
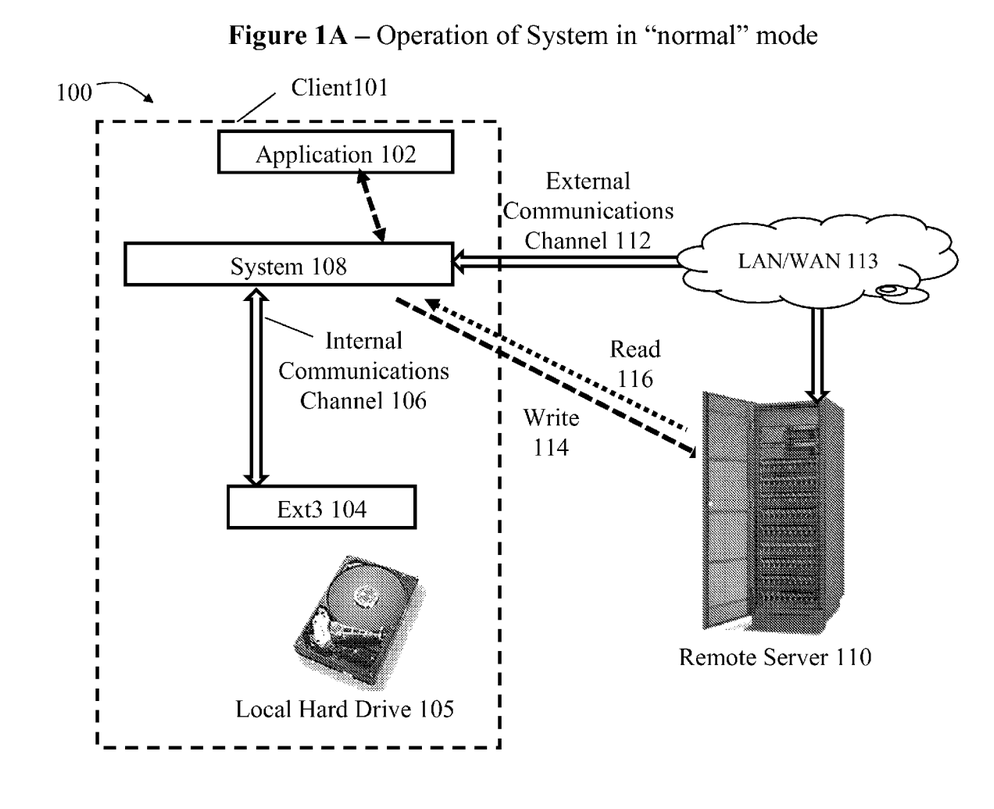
FIG. 1A illustrates the system according to the present invention in "normal" mode of operation.

The continuous data protection (CDP) client file system of the present invention reverses the use of backup and local hard disk storage under the normal conditions, that is, all read and write requests are normally sent to a remote backup target and not to the local disk. The system 100 of the present invention is shown in FIG. 1A having CDP client 101 which has an application 102 connected to a CDP system 108, such as IBM's Tivoli® Continuous Data Protection (CDP) for Files. (Tivoli CDP for Files is an integrated recovery solution that provides complete data protection in case of a corruption, user error, virus, or system failure. For more information, see http://www-306.ibm.com/software/tivoli/resource-center/storage/cdp.jsp?S$_{13}$ TACT=104CB62&ca=104CB627). CDP system 108 is connected to remote server 110 via external communications channel 112 and network 113 so that write operations 114 and read operations 116 may be made against remote server 110. The system 100 further has a local hard drive 105. CDP can be provided on the server side (110). In that case, it is necessary to implement a special mechanism to allow remote clients to request particular versions of a file from the versioning file system. Note that it is also possible to run a stackable versioning file system on the clients. This implementation allows the system to use existing file servers (e.g., NFS or CIFS servers) 110 without any modifications but is expected to have poor performance. In typical usage, according to the present invention, data for application 102 is stored (long term) in remote server 110 and the application 102 performs read/write operation against it on an as needed basis when the network 113 and remote server 110 are operational.

Figure 1B:
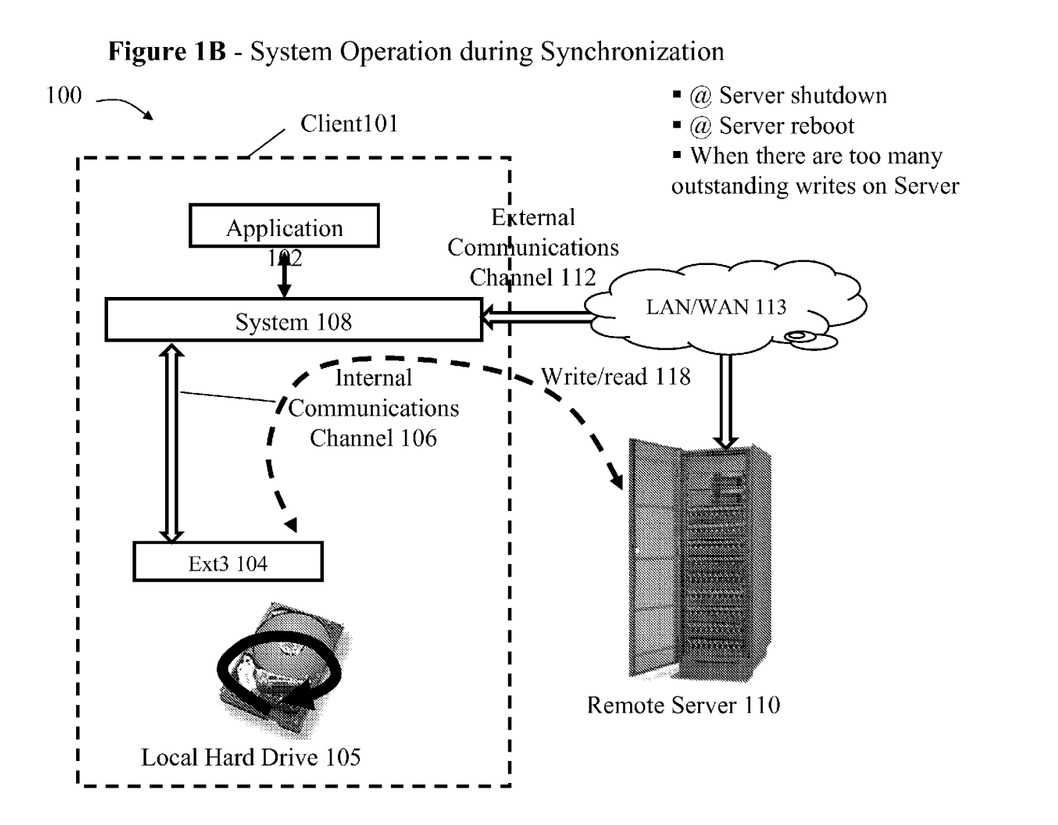
FIG. 1B illustrates the system according to the present invention operating during synchronization.
Figure 1C:
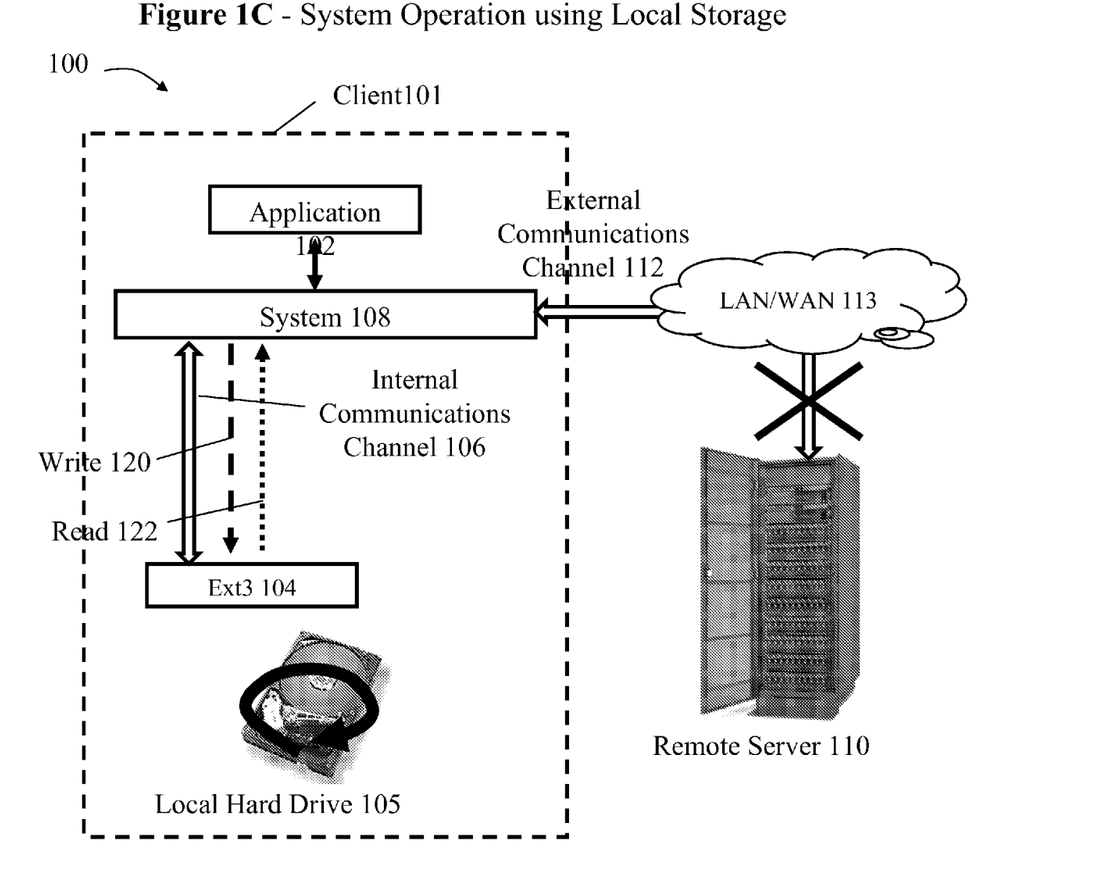
FIG. 1C illustrates the system according to the present invention in operation using local storage for file access.

FIG. 1B shows an illustration of the system 200 of the present invention during a time when the remote server 110 is synchronizing with the local hard drive 105 of CDP client 101. Synchronization (as illustrated by bidirectional read/write arrow 118) occurs at client 101 shut down (so that the local hard drive 105 has all of the updates during the time in which the remote server 110 was the primary storage for the client), at client 101 boot up (so that the local hard drive 105 and the remote server 110 have updates that may have been missed due to a client crash or its ungraceful shutdown), when the client regains connectivity with the server, when the server is down, or network is down or has insufficient capacity to handle data transfer to/from server 110, or when the client has too many outstanding writes for local hard drive 105. Other conditions which, when they exist, cause synchronization include manual disk spin-up by the user and spin-up due to user convenience are not mentioned here. This is shown in FIG. 1C by read/write arrows 122/120 between application 102 and local hard drive 105 over internal communications channel 106.

Figure 1D:
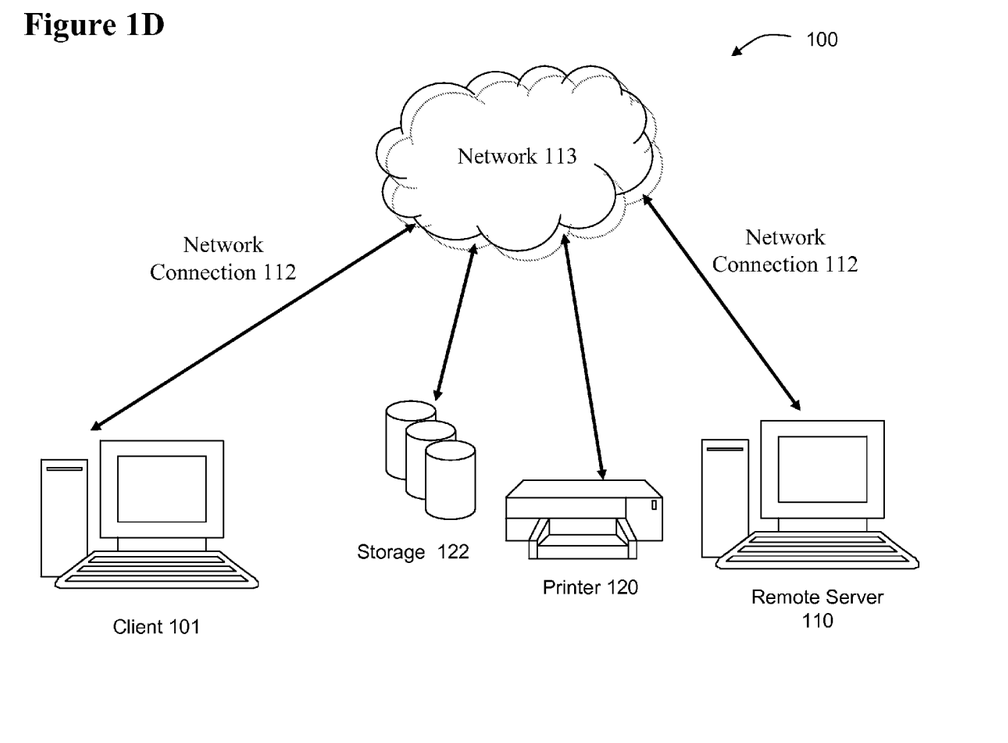
FIG. 1D illustrates the system according to the present invention at a high level.

A basic network diagram is shown in FIG. 1D. Network adapters (network adapter 438 in FIG. 4) are coupled to the system to enable the system 100 (as shown in FIG. 1D, client 101) to become coupled to a target server (remote server 110) or remote printers (printer 120) or storage devices (storage 122) through intervening private or public networks (network 113). (A computer network is composed of multiple computers connected together using a telecommunication system for the purpose of sharing data, resources and communication. For more information, see http://historyoftheinternet.org/). Modems, cable modems and Ethernet cards are just a few of the currently available types of network adapters. (A network card, network adapter or NIC (network interface card) is a piece of computer hardware designed to allow computers to communicate over a computer network. It is both an OSI layer 1 (physical layer) and layer 2 (data link layer) device, as it provides physical access to a networking medium and provides a low-level addressing system through the use of MAC addresses. It allows users to connect to each other either by using cables or wirelessly.)

As discussed above, the client of the present invention reverses the roles of the remote server 110 and the local hard disk 105: local hard disk 105 becomes a backup of the data stored remotely. It is used when the local network infrastructure (LAN/WAN 113) is having problems, is not sufficient for high-bandwidth workloads, and when mobile clients operate in the disconnected mode or with poor network connectivity.

The reverse mode of operation allows the client of the present invention to keep the system and other local workstation hard disks off most of the time. In a sense, the local hard disk becomes a recovery mechanism in case of server connectivity problems or when remote storage bandwidth or latency would cause noticeable inconvenience for the users.

Figure 2:
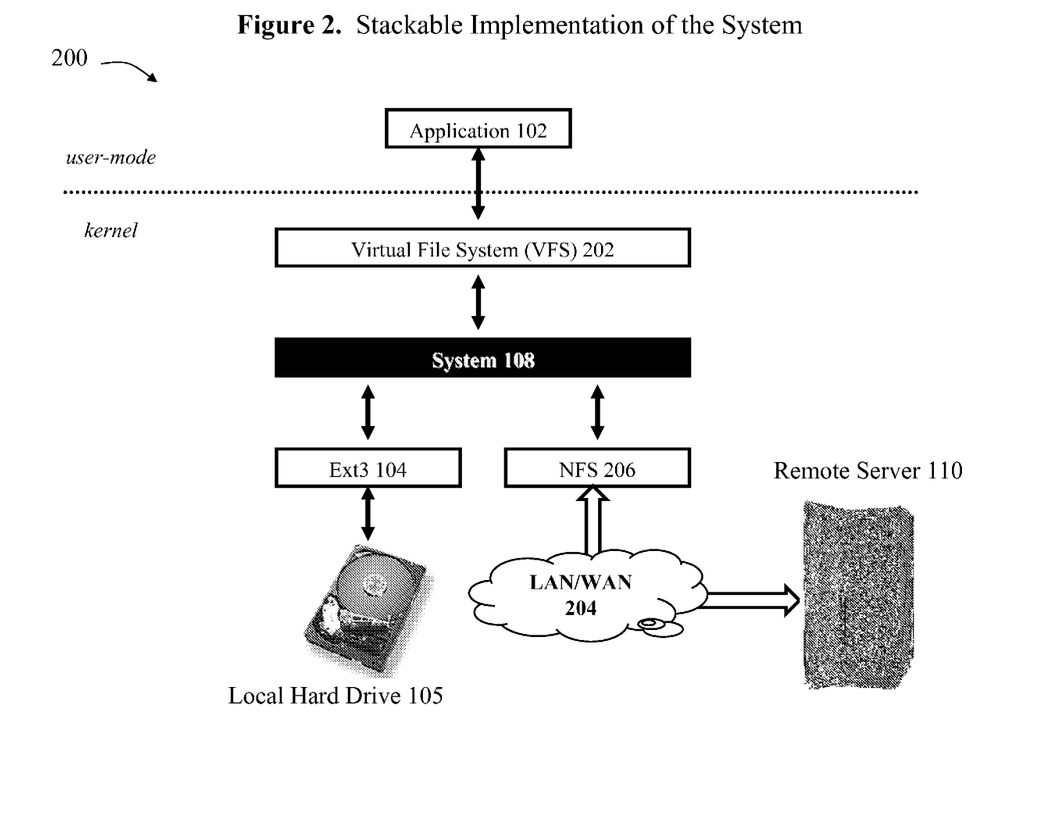
FIG. 2 shows an illustration of a stackable implementation of the system of the present invention.

The system 200 of the present invention can be implemented as a stackable device driver or as a stackable file system as shown in FIG. 2. Stackable device drivers operate below file system caches and do not have direct access to the meta-information and, therefore, are not considered here. Stackable file systems, such as the stackable file system 200 as shown in FIG. 2, operate above file system caches, have access to the meta-information, and can reuse well-maintained code and features of other existing file systems. A stackable file system 200 that implements the proposed functionality can be mounted over two lower file systems: a local file system such as Ext3 104 mounted on a local hard disk 105 and a remote file system such as NFS 206 or CIFS. The stackable file system 200 of the present invention can use any of the two lower file systems 104, 206 as a primary file system. In the simplest case, the local disk drive 105 will get turned off automatically by APM or ACPI if unused for some time. (Advanced Power Management (APM) is an API developed by Intel and Microsoft which enables an operating system running an IBM-compatible personal computer to work with the BIOS (part of the computer's firmware) to achieve power management. ACPI is intended as the successor to APM. The Advanced Configuration and Power Interface (ACPI) specification is an open industry standard first released in December 1996 developed by HP, Intel, Microsoft, Phoenix and Toshiba that defines common interfaces for hardware recognition, motherboard and device configuration and power management. According to its specification, "ACPI is the key element in Operating System-directed configuration and Power Management (OSPM)".) In the more complicated case, the stackable file system 200 can explicitly put the local hard disk 105 into the stand-by mode.

An independent client-side solution has to support data versioning of the backed up data completely on the client side. For example, this can be achieved using VersionFS stackable file system mounted over the remote file system. In that case, a client can communicate with any standard file server without requiring any changes on the server side. Unfortunately, such an implementation may have poor performance because of the excessive amount of requests and data sent between the client and the server. For performance reasons, it may be necessary to support file versioning on the server side and to support a special protocol allowing the clients to roll-back to any previous file version.

Common CDP systems backup only a subset of the user file system. However, there is a problem in that users frequently make errors when selecting the subset of files to back up. The present invention does not allow this as everything is backed up.

Compression not only saves storage space but also can improve server performance because of the smaller cache memory consumption. In any case, backup of the program binaries and other regeneratable files can make it easier to restore these files from backups than to reinstall the corresponding programs and regenerate some other files.

Nevertheless, if backing up the regeneratable data is undesirable, one can still backup such files or only the most often used ones.

The described stackable file system implementation can be naturally extended to support an extra lower file system mounted over a flash memory device. This extra lower file system can be used similar to the hybrid drives and driver-level flash memory solutions to buffer writes and keep some extra prefetched data. However, file-system-level implementation has several additional advantages:
1. access to the meta-information to make smarter data prefetching decisions;
2. operation above the page cache, which improves performance; and 3. reuse of other file systems. For example, the proposed stackable file system can be mounted over a file system specifically designed for flash memory (e.g., JFFS2) to prolong the flash drive lifetime.

Figure 3A:
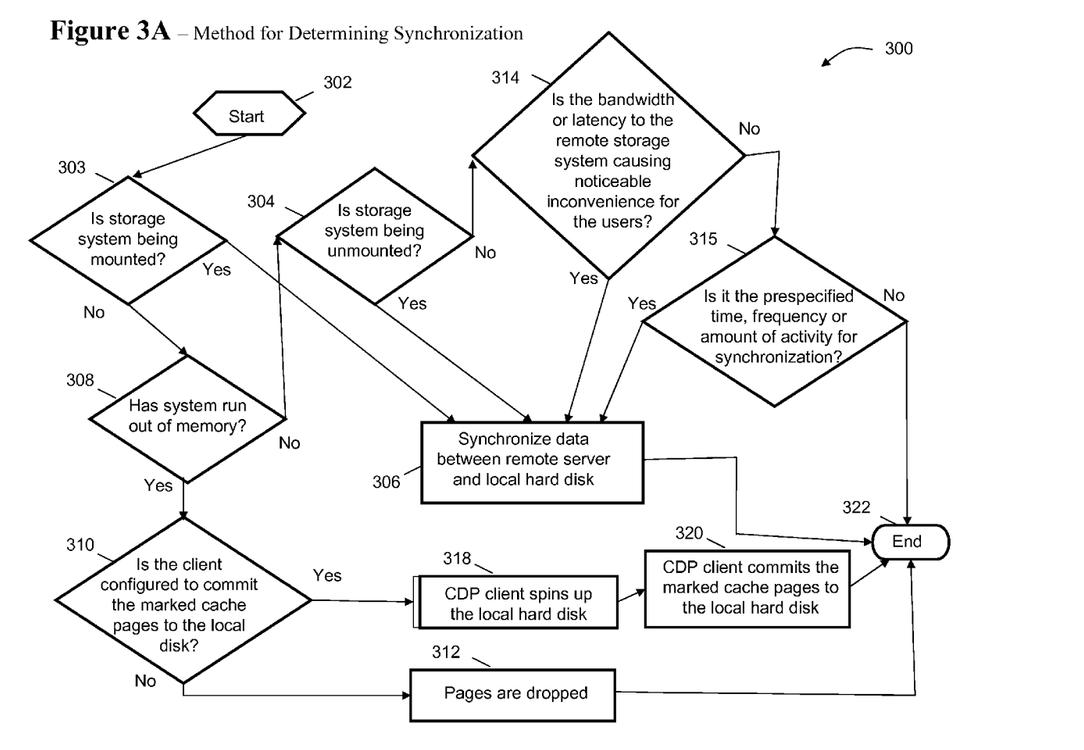
FIG. 3A illustrates the method according to the present invention for determining when synchronization is needed.

The data updates are synchronized with the local disk several times a day based on several conditions. This method 300 for determining synchronization implementation is shown in FIG. 3A and starts at step 302. At step 303, it is determined whether the storage system is being mounted. If so, at step 306, the synchronization process continues where the CDP client of the present invention synchronizes the data between the remote server and the local hard drive. This guarantees that, even if the network connectivity to the remote server is not available upon next boot up operation, the system will still have all the data locally to operate autonomously. Then the method proceeds the step 322 where the method ends. If not, at step 308, it is determined whether the system has run out of memory and, if not, step 304, it is determined whether the storage system is being unmounted. If so, the synchronization process continues at step 306 as discussed above. If, at step 308, it is determined that the system has run out of memory, at step 310, it is determined whether the CDP client of the present invention is configured to spin up the local hard disk and commit the marked cache pages to the local disk. If not, the pages are dropped at step 312 and the process ends at step 322. This mode is suitable for permanent servers and workstations. Even if they are rebooted or their software crashes, their local hard disks can be resynchronized during the following boot time. If so, at step 318, the CDP client spins up the local hard disk and, at step 320, the CDP client commits the marked cache pages to the local hard disk and the process ends at step 322. This configuration is necessary for mobile computers that may become disconnected from the server at any time. They are usually equipped with 2.5 inch hard disks and can sustain relatively frequent spin up operations. Also, this mode may be necessary in the office environments with unstable network connectivity. The system of the present invention has several optimizations for performance improvement. In particular, if the client does not drop pages at step 312, they do not have to be fetched from the server on synchronization. Also, if the data is not modified by the client, the information on server does not change and, therefore, there is no need to revalidate the data and metadata. The CDP client marks memory cache pages which were modified (cache 430 is shown in a representative client 402 in FIG. 4) and not committed to the local disk (418 in FIG. 4) (even if they were committed to the remote storage system). If, at 304, it is determined that the storage system is not being unmounted, at 314, it is determined whether the bandwidth or latency to the remote storage system causes noticeable inconvenience for the users. If so, the process moves to step 306 and continues as discussed above. Thus, the system and method of the present invention spins up the disk, not only because it detects that it can save power by using the local storage, but also if there is a long period of high bandwidth data read activity.

The system and method of the present invention do the same for writes if the system page cache gets filled with outstanding write requests. Again, this is necessary to avoid user inconvenience due to excessive cache purging and to improve data reliability.

In any case, the CDP client of the present invention periodically synchronizes the copies at configurable frequency, for example, at least once a day or at particular times of low system activity. This is shown in FIG. 3A where, at step 314, if the bandwidth or latency to the remote storage system is not causing noticeable inconvenience for the users, the process moves to step 315 where it is determined whether it the prespecified time, prespecified frequency or prespecified amount of activity for synchronization has been reached. If not, the process ends at step 322 or, alternatively, if so, the process moves to step 306 as discussed previously. FIG. 3A illustrates the conditions for synchronization (steps 303, 304, 314, 315) being examined in a serial manner but alternatively the conditions for synchronization could be examined in a parallel manner.

Alternatively, a user may want to manually turn on the disk for a limited amount of time for some specific reason.

The CDP client of the present invention keeps information about the rate of spin up operations and total spin time and balances the user convenience accordingly. Thus, the CDP client of the present invention will not spin up the local hard disk even in case of high bandwidth utilization if the disk was spun up too many times or was spun in total time too long within the last several days.

Figure 3B:
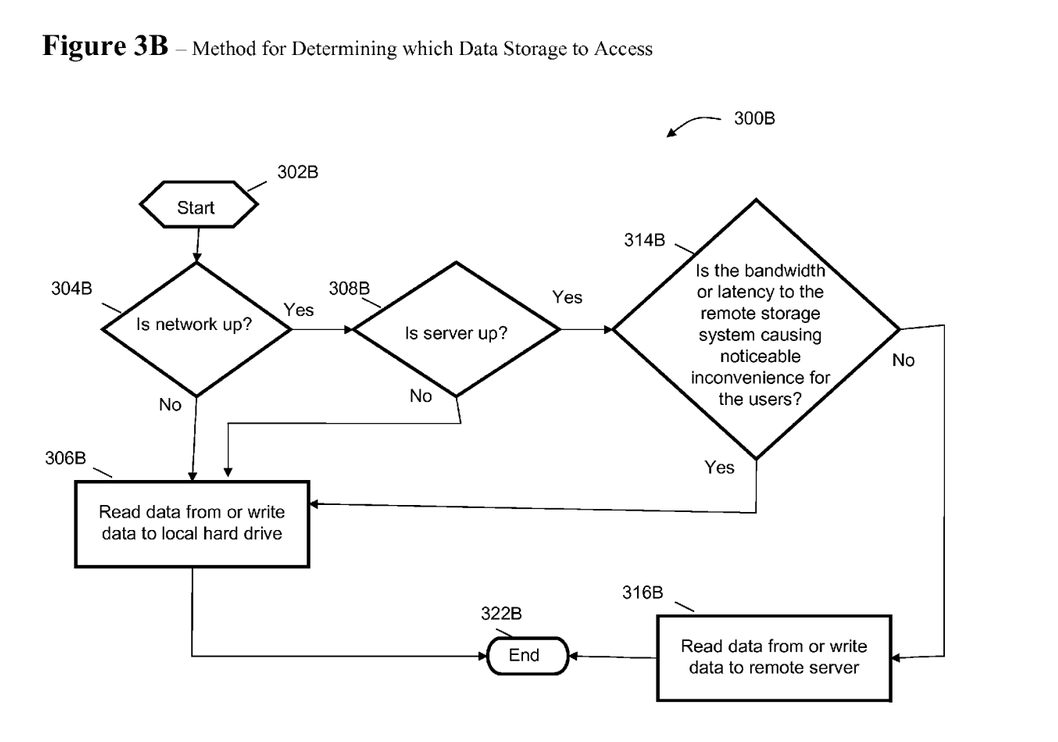
FIG. 3B illustrates the method according to the present invention for determining which data storage to access.

FIG. 3B illustrates the method 300B for determining, by the client, which data storage to access when a read or a write operation is necessary and starts at step 302B and continues to step 304B where it is determined whether the network connection to the remote server is available. If not, at step 306B, the data is read from or written to, as the case may be, the local hard drive and the process ends at step 322B. If so, at step 308B, it is determined whether the remote server is up and operational. If not, the process moves to step 306B as discussed above. If the remote server is up and operational, at step 314B, it is determined whether the bandwidth or latency to the remote storage system is causing noticeable inconvenience for the users and, if so, the process moves to step 306B as discussed above. If not, at step 316B, the data is read from or written to, as the case may be, the remote server and the process ends at step 322B.

Figure 4:
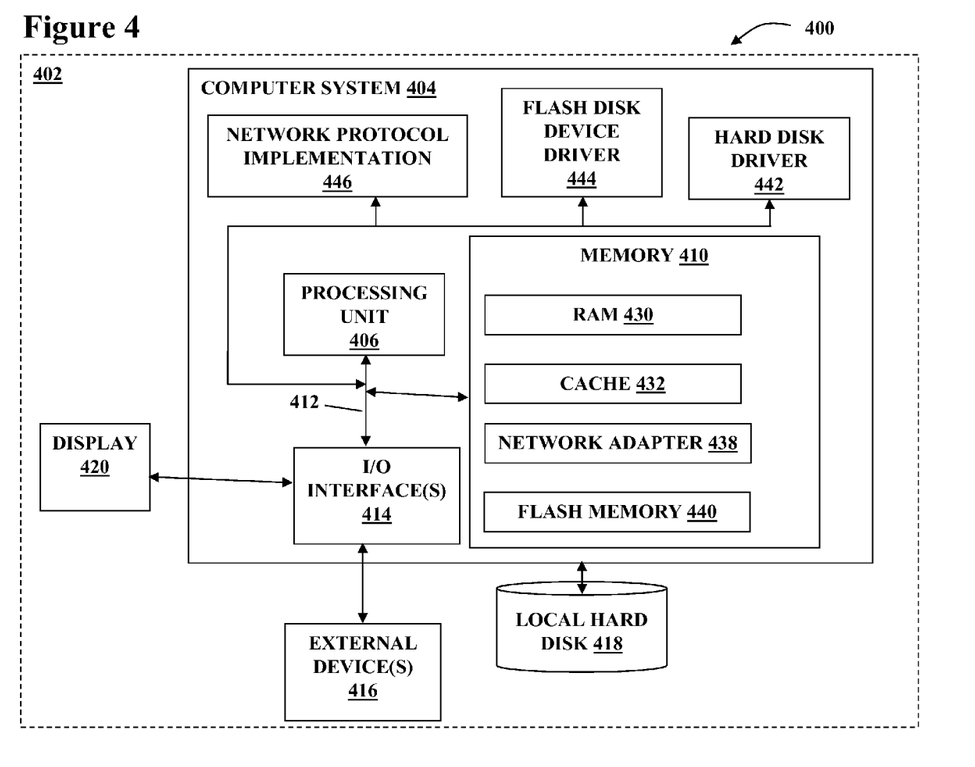
FIG. 4 illustrates the client according to the present invention.

As shown in FIG. 4, the client 402 in 400 system performs reversed backup operation for keeping local hard drives (local hard drive storage 418) in a stand-by mode thereby extending the life of local hard drives (local hard drive storage 418) and reducing power consumption, heat and noise produced by the local drives (local hard drive storage 418). As with many data processing systems, client 402 is suitable for storing and/or executing program code will include at least one processor (processing unit 406) coupled directly or indirectly to memory elements through a system bus. The memory elements can include local memory (RAM 430) employed during actual execution of the program code, bulk storage (local hard drive storage 418), and cache memories (cache 432) which provide temporary storage of at least some program code in order to reduce the number of times code must be retrieved from remote server 110 during normal operation or from local hard drive storage 418 during operation when remote server 110 is not available. Input/output or I/O devices (external devices 416) (including but not limited to keyboards, displays, pointing devices, etc.) are coupled to the system either directly or through intervening I/O controllers (I/O Interface 414). Client 402 further has flash memory 440.

It should be understood that the present invention is typically computer-implemented via hardware and/or software. As such, and client systems and/or servers will include computerized components as known in the art. Such components typically include (among others), a processing unit, a memory, a bus, input/output (I/O) interfaces, external devices, etc.

It should also be understood that although a specific embodiment involving local flash memory and a remote server hybrid for continuous data protection has been depicted and described, the present invention could be implemented in conjunction with any type of backup server.

While shown and described herein as a system and method for reversed backup operation for keeping local hard drives in a stand-by mode thereby extending the life of local hard drives and reducing power consumption, heat and noise produced by the local drives, it is understood that the invention further provides various alternative embodiments. For example, in one embodiment, the invention provides a computer-readable/useable medium that includes computer program code to enable a computer infrastructure to allow for a reversed backup operation. To this extent, the computer-readable/useable medium includes program code that implements each of the various process steps of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory and/or storage system (e.g., a fixed disk, a read-only memory, a random access memory, a cache memory, etc.), and/or as a data signal (e.g., a propagated signal) traveling over a network (e.g., during a wired/wireless electronic distribution of the program code).

In still another embodiment, the invention provides a computer-implemented method for a reversed backup operation for keeping local hard drives in a stand-by mode thereby extending the life of local hard drives and reducing power consumption, heat and noise produced by the local drives. In this case, a computerized infrastructure can be provided and one or more systems for performing the process steps of the invention can be obtained (e.g., created, purchased, used, modified, etc.) and deployed to the computerized infrastructure. To this extent, the deployment of a system can comprise one or more of (1) installing program code on a computing device, such as computer system from a computer-readable medium; (2) adding one or more computing devices to the computer infrastructure; and (3) incorporating and/or modifying one or more existing systems of the computer infrastructure to enable the computerized infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

I claim:

1. A method of reversed data backup for keeping local hard drives in a stand-by (non-spinning) mode and minimizing the number of disk spin-up operations thereby extending the life of local hard drives and reducing power consumption, heat and noise produced by the local hard drives in a system having a remote server for storing data from a client, the client for writing client data to and for reading client data from the remote server over a network, the client having at least one local hard drive for providing a back up of the client data stored on the remote server, the method comprising the steps of:
   a. determining if one or more conditions exist to synchronize the client data stored on the remote server with the local hard drive; and
   b. if at least one of the one or more conditions exist, synchronizing the client data between the remote server and the local hard drive,
   wherein the remote server is used as a primary system for storage when network connectivity and bandwidth are available, and
   wherein the client is configured to perform all operating system and application activities from the local hard drive when the network connectivity and bandwidth are unavailable; and
   wherein the at least one local hard disk does not spin up even in case of high bandwidth utilization if the at least one hard disk has spun up at least one of: too many times or too long in total time within a pre-determined time period.

2. The method of claim 1 wherein one of the one or more conditions is that a prespecified amount of time since a most recent synchronization has passed, another of the one or more conditions is that a prespecified frequency rate of synchronizations has been reached and another of the one or more conditions is that a prespecified amount of activity of client data writes to and reads from the remote server has been exceeded.

3. The method of claim 1 wherein one of the one or more conditions is that the client has run out of memory.

4. The method of claim 3 further comprises the steps of:
   determining whether the client is configured to commit the data to the at least one local hard drive;
   if not, dropping the pages; and
   if so, spinning up the local hard disk and committing the data to the local hard drive.

5. The method of claim 4 further comprising the step of determining whether any of the other conditions exist and, if so, synchronizing the data between the remote server and the local hard drive.

6. The method of claim 1, if none of the conditions exists, further comprising the step of not synchronizing the client data between the remote server and the local hard drive.

7. A method, in a system having local data storage in a client and remote data storage, the client and the remote data storage being connected via a network, for determining which data storage the client to access, the method comprising the steps of:
   determining whether the network is operational;
      if not, the client accessing the local data storage;
      if so, determining whether the remote data storage is operational;
         if not, the client accessing the local data storage;
         if so, determining whether bandwidth or latency to the remote storage system is causing noticeable inconvenience for the users;
            if so, the client accessing the local data storage; and
            if not, the client accessing the remote data storage,
   wherein the remote server is used as a primary system for storage when network connectivity and the bandwidth are available, and wherein the client is configured to perform all operating system and application activities from the local hard drive when the network connectivity and bandwidth are unavailable; and wherein the local data storage is not accessed up even in case of high bandwidth utilization if the local data storage has been accessed at least one of: too many times or too long in total time within a pre-determined time period.

8. A computer program product in a computer readable storage medium for operating in a system comprising a network I/O, a CPU, and one or more databases, for implementing a method for reversed backup operation for keeping local hard drives in a stand-by (non-spinning) mode and minimizing the number of disk spin-up operations thereby extending the life of local hard drives and reducing power consumption, heat and noise produced by the local drives in the system, the system further comprising a remote server for storing data from a client and having client data stored thereon, the client for reading client data from and writing data to the client remote server over a network, the client having at least one local hard drive for providing a back up of the client data stored a storage system on the remote server, the method comprising the steps of:

a. determining if one or more conditions exist to synchronize the client data stored on the remote server with the local hard drive; and b. if at least one of the one or more conditions exists, synchronizing the client data between the remote server and the local hard drive, wherein the remote server is used as a primary system for storage when network connectivity and bandwidth are available, wherein the client is configured to perform all operating system and application activities from the local hard drive when the network connectivity and bandwidth are unavailable; and wherein the local hard drive is not accessed up even in case of high bandwidth utilization if the local hard drive has been accessed at least one of: too many times or too long in total time within a pre-determined time period of: too many times or too long in total time within a pre-determined time period.

9. The computer program product of claim 8 wherein one of one or more conditions is that the bandwidth or latency between the client and the remote storage system is causing noticeable inconvenience for one or more users of the system.

10. The computer program product of claim 8 wherein one of one or more conditions is that a prespecified amount of time since a most recent synchronization has passed, another of the one or more conditions is that a prespecified frequency rate of synchronizations has been reached and another of the one or more conditions is that a prespecified amount of activity of client data writes to and reads from the remote server has been exceeded.

11. The computer program product of claim 8 wherein one of the conditions is that the client has run out of memory.

12. The computer program product of claim 11 further comprising the steps of:

determining whether the client is configured to commit the data to the local hard drive;

if not, dropping the pages; and if so, spinning up a local hard disk and committing the data to the local hard drive.

13. The computer program product of claim 12 further comprising the step of, if not, determining whether any of the other conditions exist and, if so, synchronizing the data between the remote server and the local hard drive.

14. The computer program product of claim 8 wherein, if none of the conditions exists, the method further comprising the step of not synchronizing the client data between the remote server and the local hard drive.

15. A computer program product in a computer readable storage medium for operating in a system comprising a network I/O, a CPU, and one or more databases, for implementing a method for reversed backup operation for keeping local hard drives in a stand-by (non-spinning) mode and minimizing the number of disk spin-up operations thereby extending the life of local hard drives and reducing power consumption, heat and noise produced by the local drives in the system, the system further comprising a remote server having remote data storage for storing data from a client and having client data stored thereon, the client for accessing data to and from the remote server over a network, the client having local data storage that includes at least one local hard drive for providing a back up of the data stored on the remote server, the method comprising the steps of:

determining whether the network is operational;

if not, the client accessing the local data storage;

if so, determining whether the remote data storage is operational;

if not, the client accessing the local data storage;

if so, determining whether bandwidth or latency to the remote storage system is causing noticeable inconvenience for users;

if so, the client accessing the local data storage; and if not, the client accessing the remote data storage, wherein the remote server is used as a primary system for storage when network connectivity and bandwidth are available, and wherein the client is configured to perform all operating system and application activities from the local hard drive when the network connectivity and bandwidth are unavailable; and wherein the local data storage is not accessed up even in case of high bandwidth utilization if the local data storage has been accessed at least one of: too many times or too long in total time within a pre-determined time period.

16. A system for reversed backup operation for keeping local hard drives in a stand-by (non-spinning) mode and minimizing the number of disk spin-up operations thereby extending the life of local hard drives and reducing power consumption, heat and noise produced by the local drives, the system comprising:

a. a remote server for storing client data from a client;

b. a client connected to the remote server over a network for reading client data from and writing client data to the remote server over the network, the client having at least one local hard drive for providing a back up of the client data stored on the remote server; and c. a processing unit for determining if one or more conditions exist to back up the client data stored on the remote server to the local hard drive so that a back up of the client data is stored on the local hard drive and for backing up the client data from the remote server to the local hard drive and, if all of the one or more conditions exist, backing up the client data from the remote server to the local hard drive, wherein the remote server is used as a primary system for storage when network connectivity and bandwidth are available, and wherein the client is configured to perform all operating system and application activities from the local hard drive when the network connectivity and bandwidth are unavailable; and wherein the local hard drive is not accessed up even in case of high bandwidth utilization if the local hard drive has been accessed at least one of: too many times or too long in total time within a pre-determined time period.

17. The system of claim 16 wherein one of the one or more conditions is that a prespecified amount of time since a most recent synchronization has passed, another of the one or more conditions is that a prespecified frequency rate of synchronizations has been reached and another of the one or more conditions is that a prespecified amount of activity of client data writes to and reads from the remote server has been exceeded.

* * * * *